United States Patent [19]
White et al.

[11] Patent Number: 5,955,881
[45] Date of Patent: Sep. 21, 1999

[54] LINKAGE POSITION SENSOR HAVING A MAGNET WITH TWO RAMPED SECTIONS FOR PROVIDING VARIABLE MAGNETIC FIELD

[75] Inventors: James E. White, Warsaw; Jeffrey L. McCurley; John Zdanys, Jr., both of Elkhart; Robert J. Campbell, Granger; Craig A. Jarrard, Middlebury, all of Ind.

[73] Assignee: CTS Corporation

[21] Appl. No.: 08/767,828

[22] Filed: Dec. 17, 1996

Related U.S. Application Data

[63] Continuation of application No. 08/325,660, Oct. 18, 1994, abandoned.

[51] Int. Cl.[6] ............................... G01B 7/14; G01B 7/30
[52] U.S. Cl. ................... 324/207.2; 324/207.21; 324/207.24; 324/207.25
[58] Field of Search ............. 324/207.2, 207.21–207.24, 324/207.26, 173, 174, 207.25; 338/32 R, 32 H

[56] References Cited

U.S. PATENT DOCUMENTS

| | | | |
|---|---|---|---|
| 3,112,464 | 11/1963 | Ratajski et al. | 338/32 H |
| 3,118,108 | 1/1964 | Zoss et al. | 324/251 |
| 4,392,375 | 7/1983 | Eguchi et al. | 324/207.21 X |
| 4,570,118 | 2/1986 | Tomczak et al. | 324/251 X |
| 4,703,261 | 10/1987 | Berchtold | 324/207.2 |
| 4,919,106 | 4/1990 | Kodama et al. | 123/617 |
| 5,159,268 | 10/1992 | Wu | 324/207.2 |
| 5,164,668 | 11/1992 | Alfors | 324/207.2 |
| 5,191,284 | 3/1993 | Moretti et al. | 324/207.2 X |

FOREIGN PATENT DOCUMENTS

| | | | |
|---|---|---|---|
| 4115483 | 11/1992 | Germany | 324/207.2 |
| 0006701 | 1/1989 | Japan | 324/207.2 |
| 990993 | 5/1965 | United Kingdom | 324/174 |
| 2229006 | 9/1990 | United Kingdom . | |

*Primary Examiner*—Sandra L. O'Shea
*Assistant Examiner*—Jay M. Patidar

[57] ABSTRACT

An extremely reliable and effective position sensor is provided at low cost for determining the relative position of a mechanical linkage with respect to a reference point. The position sensor includes a rotor or bracket which is mechanically coupled to the linkage and contains at least two magnets on opposite walls adjacent a channel opening. The opposing magnets are formed with first and second sloped or ramped sections which produce produce variable magnetic fields as determined by the geometric profile of the magnets. One or more detectors are positioned in the air gap between the opposing magnets. As the linkage is moved, the rotor or bracket moves with respect to the detector causing a change in the strength of the magnetic field detected by the detector, whereby the detector determines the position of the movable linkage.

33 Claims, 4 Drawing Sheets

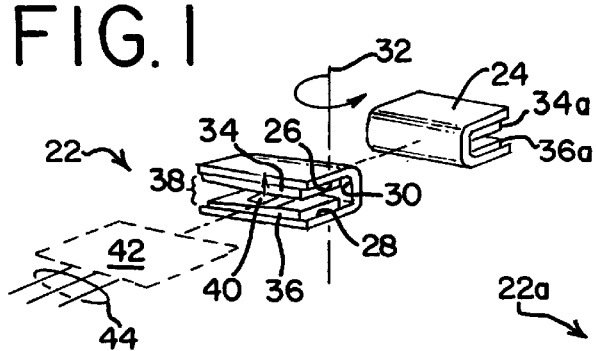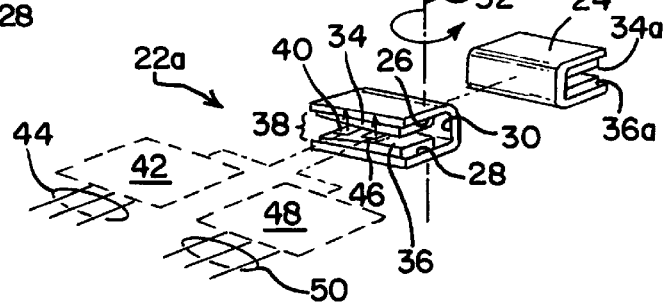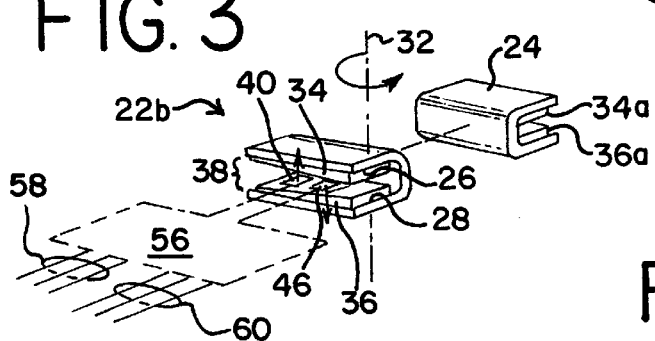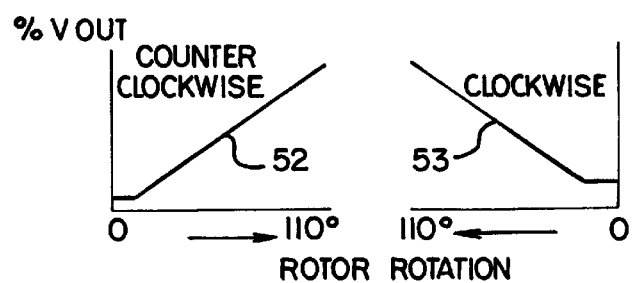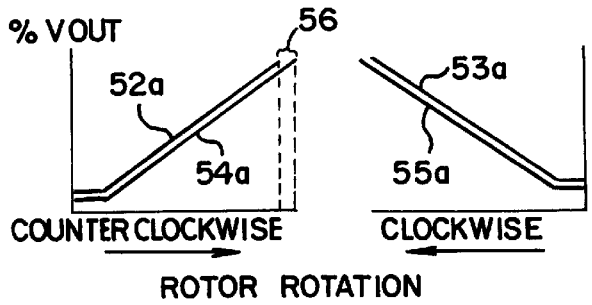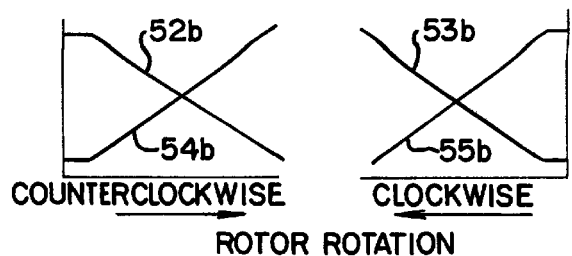

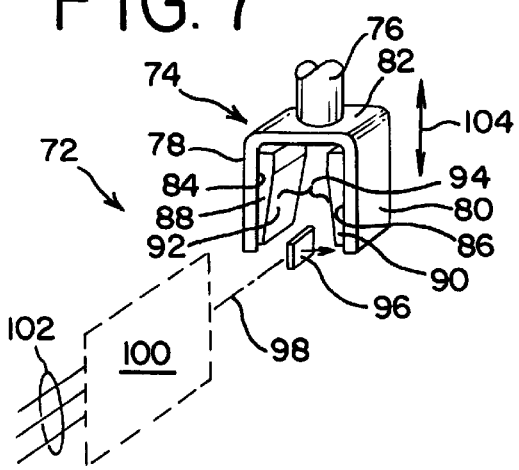
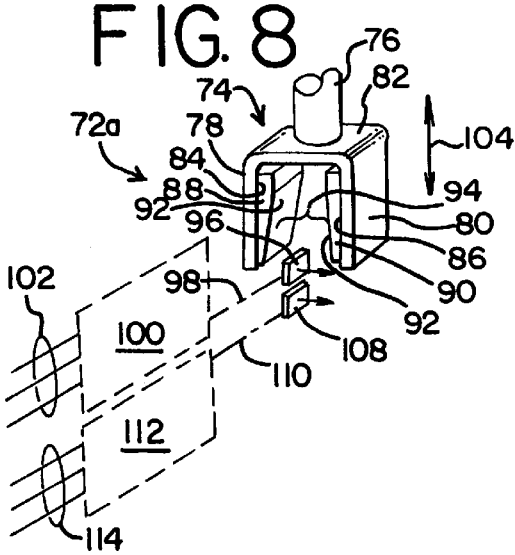
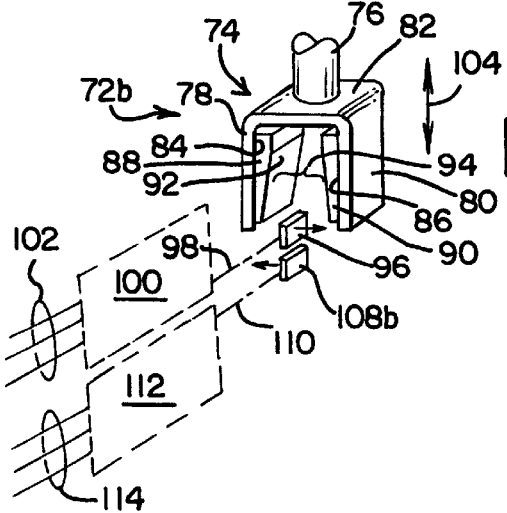
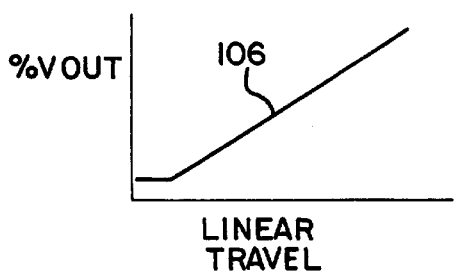
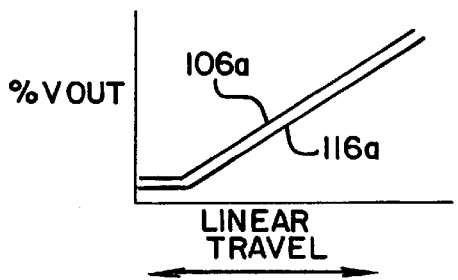
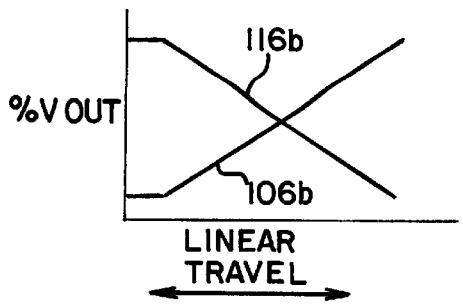

LINKAGE POSITION SENSOR HAVING A MAGNET WITH TWO RAMPED SECTIONS FOR PROVIDING VARIABLE MAGNETIC FIELD

CROSS REFERENCE TO RELATED APPLICATIONS

This is a continuation of application Ser. No. 08/325,660, filed Oct. 18, 1994 (which is now abandoned).

BACKGROUND OF THE INVENTION

1. Field of the Invention

This invention relates generally to position sensors and particularly to position sensors used to detect the relative position of a rotary or linear linkage. More particularly, the invention is for a position sensor for detecting the position of linkages in automobiles and other vehicles.

2. Description of the Related Art

There are a variety of known techniques for sensing position. Optical, electrical, electrostatic, and magnetic fields are all used with apparatus to measure position. A few of the known apparatus are resistive contacting sensors, inductively coupled ratio detectors, variable reluctance devices, capacitively coupled ratio detectors, optical detectors using the Faraday effect, photo-activated ratio detectors, radio-wave directional comparators, and the electrostatic ratio detectors. There are many other known detectors too numerous to mention herein.

The previous detection methods each offer advantages for one or more applications, but none meet all application requirements for all position sensing applications. The limitations may be cost, sensitivity to particular energies and fields, contamination, stability, ruggedness, linearity, precision, or other similar factors which tend to degrade the signal provided or otherwise make the sensor undesirable.

Vehicle applications generally, and automotive applications specifically, are very demanding environments for position sensors. Temperatures may range as high as 150° C. or more. At the other extreme, the sensor may be exposed to extremely cold environments and be expected to function without special preparation or preheating of the position sensors. Additionally, sensors are exposed to harsh road contaminants such as dirt, mud, water, and corrosion-producing elements such as salt. Moreover, vehicle sensors must endure many millions, and perhaps billions, of small motions referred to in the industry as "dithers." The dithers are the result of mechanical motion and vibration transferred from the vehicle to the sensor. Additionally, during the life of a sensor, there may be a million or more full stroke cycles of motion. All of these dithers or movements of the sensor can affect signal quality.

The environments the sensors are exposed to have caused the industry to explore very rugged and durable components for use in such sensors. One particular group of sensors, those which utilize magnetic energy, are rapidly being accepted in these demanding applications. This is because the inherent insensitivity of the magnetic system to contaminants along with the durability of the component makes the system very attractive. The problem with the prior magnetic systems is that they were too expensive to manufacture. Additionally, any lateral movements of the magnets with respect to the detector produced undesirable signal variations.

SUMMARY OF THE INVENTION

The present invention overcomes the limitations of prior magnetic position sensors. The position sensor of this invention produces a stable, linear output despite dithers or vibrations produced along any axis and is resistant to a wide range of temperatures. Additionally, the position sensor is significantly less expensive to manufacture than prior magnetic position sensors and can easily be configured for a wide range of applications.

One embodiment of the position sensor utilizes at least one pair of spaced, bonded-ferrite magnets, each molded into a wedge-shaped configuration and mounted to a predetermined portion of a vehicle linkage. The space between the bonded-ferrite magnets defines an air gap which is wider at one end than at the other. The pair of magnets produces a magnetic field which extends through the air gap. Disposed within the air gap and mounted to a portion of the vehicle other than the linkage is a magnetoresistor, Hall effect detector or other detector. The magnets and detector are configured so that the linkage and magnets move with respect to the detector causing the detector to produce an output representative of the relative position of the linkage.

In another form of the invention, at least one pair of bonded-ferrite magnets in the form of arcuate wedges may be disposed within a C-shaped channel of a rotor. At least one detector is disposed within the channel between the pair of magnets such that upon rotation of the rotor, the detector senses the change in magnetic field produced by the magnets and produces an output representative of the relative position.

In yet another form of the invention, a plurality of detectors may be disposed within the rotor channel between the pair of magnets to provide redundant signal outputs. In the event one detector malfunctions, another detector provides a signal indicative of the linkage position. A rotation and relative movement with respect to the plurality of detectors causes the detectors to produce an output representative of the relative position. Additionally, each detector may provide a separate output for use by separate devices or displays.

In still another form of the invention, particularly suited for linear actuation or movement of a linkage, a pair of wedge-shaped bonded-ferrite magnets may be mounted opposite each other to the inside walls of a C-shaped channel. One or more detectors may be disposed adjacent the linkage such that upon actuation of the linkage, the C-shaped channel is translated with respect to the detectors. The sweeping of the magnetic field produced by the wedge-shaped magnets causes the detectors to produce an output representative of the change of the magnetic field equal to the relative movement of the linkage.

The advantages provided by this invention include the ability to provide magnets which can be easily configured for a particular application at a fraction of the cost of conventional magnets. Additionally, the magnetic circuit is more resistant to radial and axial play caused by inertial forces or other factors. Additionally, the bonded-ferrite magnets are capable of withstanding substantial temperature variations without affecting the magnetic fields produced thereby.

BRIEF DESCRIPTION OF THE DRAWING FIGURES

A better understanding of the invention and the advantages provided thereby may be obtained by reference to the specification and the attached drawing figures, wherein:

FIGS. 1–3 schematically illustrate various embodiments of a rotary position sensor provided in accordance with this invention;

FIGS. 4–6 graphically illustrate the output produced by the position sensors shown in FIGS. 1–3, respectively;

FIGS. 7–9 schematically represent alternate embodiments of the invention as applied to linear movements of linkages;

FIGS. 10–12 graphically illustrate the output produced by the sensors illustrated in FIGS. 7–9, respectively;

FIGS. 13 and 14 schematically illustrate additional embodiments of rotary position sensors;

FIGS. 15 and 16 graphically illustrate the output produced by the embodiments shown in FIGS. 13 and 14, respectively;

FIG. 17 schematically illustrates one embodiment of the invention used to detect the position of a worm drive;

FIG. 18 graphically illustrates the output produced by the sensor shown in FIG. 17;

FIG. 19 schematically illustrates another embodiment of the invention used to detect the position of a worm drive; and FIG. 20 graphically illustrates the output produced by the sensor shown in FIG. 19.

DETAILED DESCRIPTION OF THE PREFERRED EMBODIMENTS

Figure 13:
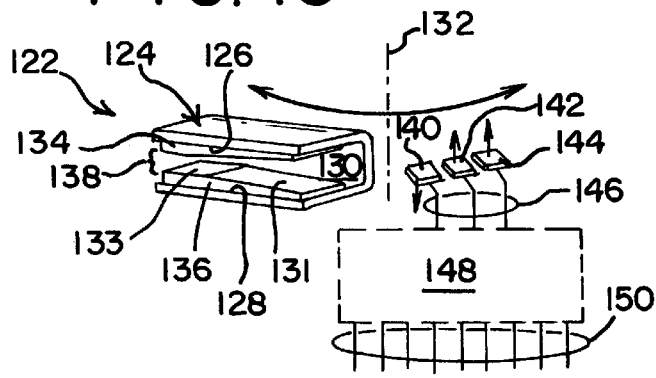

The various embodiments of the position sensor described herein can be used to detect the relative position of any one of a number of moving components including rotors (FIGS. 1–3, 13, and 14), and the translational movement of components or linkage (FIGS. 7–9, 17, and 19). In vehicles, as well as other types of machinery, rotational and translational movements of certain components can be monitored. For example, rotational and translational motions are found in a vehicle engine, EGR valve, transmission, drive train, brake and accelerator pedals, steering mechanism, suspension, and power accessories such as windows, sun roofs, and power seats. The position sensor of this invention can be used in all of these environments to monitor and control a particular component. In particular, certain applications of the position sensor have been described in copending, commonly assigned U.S. patent application Ser. No. 08/206,474; 08/206,568 now abandoned; and 08/206,982, filed on Mar. 4, 1994, all of which are incorporated herein by reference.

FIGS. 1–3, 13, and 14 illustrate various embodiments of the position sensor of this invention used to detect the relative position of a rotor. With specific reference to FIG. 1 and position sensor 22, a portion of a rotor 24 is shown which may be used, for example, to sense moving suspension components of a vehicle. The rotor 24 preferably has a C-shaped cross section formed by interior walls 26, 28 and bottom wall 30 to define a channel which opens outwardly away from the axis of rotation 32 often coincident and aligned with an axle, spindle or suspension strut (not shown). Attached to each interior wall 26, 28 of rotor 24 and having an arcuate shape conforming substantially to the circumferential dimensions defined along each wall 26, 28 are at least one pair of magnets 34, 36. Preferably at least a second pair of magnets 34a, 36a are also mounted to rotor 24 at a predetermined circumferential distance determined by the particular application. Each magnet of a pair is bonded to an opposite wall 26, 28 of the rotor 24 such that an air gap 38 is defined between them. In the preferred embodiment, each of the magnets is molded from bonded-ferrite, such as B1062 available from Arnold Engineering located in Marengo, Ill., in a specific geometric shape having a width extending from bottom wall 30 out to the edge of each wall 26, 28 farthest from axis 32 and a length following the curvature of the rotor 24. Additionally, the longitudinal profile or thickness of each magnet is preferably wedge-shaped such that when mounted on the rotor, the air gap 38 at a first end of a pair of magnets is greater than the width of the air gap at a second, opposite end of the magnet pair for reasons which will become apparent below. Depending upon the specific application, other cross-sectional profiles may be adopted.

In one embodiment of the position sensor 22 described above particularly suited for use on one or the other side of a particular machine, one pair of magnets is disposed on rotor 24 in a mirror image of the other magnet pair over a predetermined arc of the rotor. For example, if magnets 34, 36 are arranged such that air gap 38 increases between these magnets in a 110 degree or more counterclockwise arc, magnets 34a, 36a would be arranged such that air gap 38 between magnets 34a and 36a increases in a 110 degree or more clockwise arc. Additionally, the two magnet pairs 34, 36 and 34a, 36a may be spaced from each other by a predetermined distance with one end of the wedges proximate each other. In this configuration, the sensor may be used in either a left or right handed arrangement where the zero or null position for a left handed orientation may be ninety or more degrees offset from the zero position when used in the right handed orientation. One particular application may be in a suspension adjustment system where rotor 24 spins about an axis of a shock absorber or strut which has one configuration when used on the driver's side and another configuration when on the passenger side of the vehicle.

Extending into the channel of rotor 24 and located substantially midway between walls 26, 28 and the magnets such as 34, 36 is a Hall effect semi-conductor detector or magnetoresistor detector 40 such that upon rotation of rotor 24, detector 40 remains substantially stationary centrally within the channel. Although not shown, detector 40 may be suspended within the rotor channel by a non-magnetic material, such as an integrated circuit board or similar support. Also attached to the circuit board may be an analog or digital circuit 42 operably coupled to detector 40 which provides a bias to detector 40 and initially receives any output produced thereby. Circuit 42 may, in turn, be operably coupled through conductors 44 to additional circuitry or devices which process or otherwise display the output.

The use of a pair of magnets such as 34, 36 substantially reduces loss of magnetic flux through the air gap 38, which otherwise would occur with only a single magnet configuration. Additionally, the width of the magnets from bottom wall 30 and extending out to the distal edge of walls 26 and 28 results in a high concentration of magnetic field lines directly and linearly between the magnet pair. The increase in dimension from bottom wall 30 out to the distal edge of walls 26, 28 greatly reduces the bulging effect of the magnetic field. Because of the increased dimension in the width of the magnets, detector 40 will sense very little change in the magnetic field with respect to a movement of the magnets radially from rotation axis 32, such as might be caused by a force applied perpendicular to axis 32. Although the greatest concentration of magnetic field lines pass directly between the two magnets, the strength of the magnetic field will vary as a function in the change in profile of each magnet, and the varying dimension of the air gap 38.

In the configuration outlined above with respect to FIG. 1, it is possible to provide a single position sensor design for use in two or more configurations. The multiple magnet arrangement provides flexibility, resulting in less expense since the same position sensor may be used in multiple roles.

It is contemplated that each of the embodiments described herein may include at least a second, or mirror pair of magnets.

FIGS. 2 and 3 illustrate alternate embodiments 22a, 22b, respectively, of the invention shown in FIG. 1, with each capable of using a single magnet-pair or multiple magnet-pair configuration, and also providing at least a second output used to determine the relative position of the linkage with respect to a reference, or to provide an additional output for another device. For example, in the position sensor 22a shown in FIG. 2 a second detector 46, such as a magnetoresistor or Hall effect detector, is disposed within the air gap 38 adjacent detector 40 and spaced therefrom in a plane generally parallel to and containing rotor 24. Detector 46 may be supported within the channel by the same substrate supporting detector 40. Detector 46 may be operably coupled to a second circuit 48 which provides the input bias to detector 46 and receives the output therefrom. The second circuit 48 may, in turn, be operably coupled to an additional circuit or signal processing device through conductors 50.

The pair of detectors 40, 46 may be oriented within air gap 38 to produce a like output upon passing through the magnetic field generated by the magnets. Because each detector 40, 46 has the same configuration, each should produce a substantially identical output depending upon the direction of rotation of rotor 24, but delayed in time as a result of the rotational offset between the two detectors. For example, as shown in FIG. 5, curve 52a represents the response of detector 46 while curve 54a represents the output of detector 40 when rotor 24 rotates about axis 32 in a clockwise direction. Curves 53a and 55a represent the outputs when rotor 24 rotates either in an opposite direction or swings the opposite pair of magnets such as 34a, 36a past detectors 40, 46. The gap between the two curves represents the rotational offset between the detectors within the air gap 38. Note that because the detectors are configured the same, the voltage output produced by each detector substantially parallels the other. If desired, the two outputs may provide a redundant signal output to the processor if one of the detectors malfunctions. One output may be electronically trimmed or adjusted relative to the other so that the signals are superimposed with angular position or shifted apart as desired. Alternatively, each output may be used for a separate function or processed by a separate circuit.

In another approach, position sensor 22b shown in FIG. 3 may include a pair of detectors 40, 46 disposed within air gap 38 on a single substrate, with both operably coupled to a circuit 56. In one embodiment, detector 46 may have an axis of maximum magnetic sensitivity of opposite polarity with respect to detector 40, as denoted in the figures by the arrows emanating from the surfaces of the detectors 40, 46. The reversed polarity will produce an output from detector 46 of opposite slope for a given field strength change from that produced by detector 40, as illustrated in FIG. 6. For example, with detector 46 of opposite polarity from 40, as rotor 24 rotates in a clockwise direction, detectors 40, 46 enter the magnetic field at the widest end of the air gap 38 first. Detector 40 produces an increasing output while detector 46 produces a decreasing output shown by curves 52b and 54b, respectively. Again, because of the rotational offset between the detectors, curve 52b will have a slight lead time in its output, which may be corrected to account for the rotational offset. For a counterclockwise rotation, or when sensing the magnetic field produced by the second set of magnets, the opposite will be true, as shown in the right-hand portion of FIG. 6. Curve 53b illustrates the linear increase in voltage output for detector 46, while curve 55b displays the opposite, decreasing voltage output from detector 40.

The position sensor shown and described in FIGS. 1–6 is specifically configured and adapted for use with a linkage which rotates about a spindle or similar type of axis. Applications of position sensors in linear environments are also possible that offer many of the same advantages.

FIGS. 7–9 illustrate various embodiments of the position sensor for determining the relative position of a translated or linearly actuated linkage. Referring to FIG. 7, position sensor 72 includes a C-shaped bracket disposed at one end of a rod 76, which is translated or moved linearly along an axis coincident with the rod in response to actuation of the linkage to be monitored. C-shaped bracket 74 includes a pair of parallel flanges 78, 80 extending from a central flange 82 coupled to the end of rod 76. Attached to the interior walls 84, 86 of flanges 78, 80, respectively, are a pair of molded, bonded-ferrite magnets 88, 90, respectively. Each magnet 88, 90 is molded from a bonded-ferrite material, as disclosed above and available from Arnold Engineering. Each magnet 88, 90 is molded in a predetermined geometric shape, such as a wedge or prism having an inclined surface 92 extending from one end of the magnet proximate the distal edge of flanges 78, 80 to the opposite end of the magnet located proximate central flange 82. It is preferred that the profile of each magnet increase toward central flange 82, although it is contemplated that the pair of magnets may be reversed such that the distance between the magnets, or air gap 94, may be least at the end of flanges 78, 80 farthest from central flange 82.

Disposed between flanges 78, 80, and in the air gap 94 between magnets 88, 90, is at least one Hall effect or magnetoresistor detector indicated generally as 96 and operably coupled by line 98 to circuit 100. Circuit 100 is, in turn, operably coupled by conductors 102 to a signal processing device or other circuit. It is preferred that detector 96 be centrally positioned within air space or gap 94 midway between magnets 88, 90, and also be located centrally between the lateral margins of each magnet so as to occupy the greatest concentration of magnetic field lines produced by the pair of magnets. It is also preferred that the dimensions of magnets 88, 90 are substantially greater than the detector 96 such that any lateral movement of bracket 74 transverse to the axis of rod 76 in a plane containing detector 96 does not result in the detector 96 moving outside the greatest concentration of magnetic field lines produced by the magnets. In this way, the output produced by detector 96 is substantially stable. One way to help in minimizing these effects is to attach detector 96 and circuit 100 to a brace or similar structure having a bushing which receives shaft 76. Thus, any lateral movement of shaft 76 and bracket 74 results in a like movement of detector 96 so that the two components maintain their relative position to each other in directions transverse to the linear movement of shaft 76. The bushing would permit the linear travel of rod 76 along the axis generally indicated as 104.

While the bracket 74 is illustrated as having a "C" shape with the opening in the "C" being opposite central flange 82 and therefore along the axis of magnet translation, the invention also contemplates the use of a "C" shape with the opening extending perpendicular to the axis of translation, such that central flange 82 would also be a small and constant distance from detector 96 throughout the translational range of the magnets. Detector 96 would then be extending into the opening or "mouth" of the "C", as opposed to extending perpendicular thereto. Such alternate configuration will be apparent to one of ordinary skill after review of bracket 202 illustrated hereinbelow and configured in that manner.

As configured in FIG. 7, linear travel of rod 76 and bracket 74 in a downward direction along axis 104 with respect to detector 96 results in an output from detector 96 which increases in voltage as the air gap between the surfaces of magnets 88 and 90 decreases. The linear output produced by detector 96 is best illustrated by curve 106 in FIG. 10, which shows a plot in the percentage voltage output as a function of linear travel path. Curve 106 would have a decreasing slope as rod 76 and bracket 74 move in an upward direction along axis 104, and detector 96 moves with respect to bracket 74 toward the wider end of air gap 94 and the weaker field produced by magnets 88, 90.

Referring to FIGS. 8, 9, 11, and 12, alternate embodiments 72a and 72b of a linear position sensor are shown utilizing a pair of Hall effect or magnetoresistor detectors disposed within the air gap 94. Referring to FIG. 8, the second detector 108 is disposed within air gap 94 at a location spaced from detector 96 in a direction parallel to axis 104. Detector 108 may be coupled by a second conductor 110 to a separate circuit 112 operably coupled to a display device or other signal processing circuit to conductors 114. In the embodiment shown in FIG. 8, it is preferred that detector 108 have a configuration substantially identical to detector 96 so as to produce a similar output when exposed to the change in magnetic fields. This output is best illustrated by the curves 106a and 116a in FIG. 11 illustrating the increase in percentage voltage output as a function of linear travel of bracket 74 and rod 76 in a downward direction along axis 104. Curve 106a represents the output of detector 96, while curve 116a represents the lagging output of detector 108 which enters the magnetic fields after detector 96 as a result of the offset between the two detectors. As with previous embodiments, the outputs can be electrically offset to be superimposed over a large part of the curve or offset by a particular amount.

Alternatively, as shown in FIG. 9, detector 108b may be configured with opposite magnetic polarity to detector 96 such that upon passing through the magnetic fields produced by magnets 88, 90 the output produced by each will be opposite as reflected by the curves 106b, 116b of FIG. 12. Again, for a movement of rod 76 and bracket 74 in a downward direction along axis 104, the output produced by detector 96 will lead the output produced by detector 108b by an amount related to the offset distance between the two detectors along the axis parallel to axis 104.

Each of the embodiments illustrated above illustrate detectors which produce a linear output representative of a change in the magnetic field produced by the particular geometric shape of the molded, bonded-ferrite magnets 34, 36, 88, and 90. One Hall effect detector found to produce this output is Model No. KSY44 available from Siemens. Other detectors may be used in this invention which produce an output used to control other components of the machine. For example, FIGS. 13–16 illustrate yet another embodiment of the position sensor which produces multiple outputs in response to the relative position of a rotor. Specifically, with reference to FIGS. 13 and 15, position sensor 122 is contemplated to be used in association with rotor 124 substantially similar to rotor 24 described above. Rotor 124 includes a generally C-shaped cross-sectional profile to define parallel interior walls 126, 128 interconnected to each other at one end by a base wall 130. The C-shaped opening defines an annular or circumferential channel about rotor 124 which may be opened in a direction away from the axis of rotation 132, although it is contemplated that in certain circumstances the channel may be oriented toward rotation axis 132.

Disposed within the channel and attached to interior walls 126, 128 are a pair of magnetic strips 134, 136 having a generally arcuate shape so that the magnets generally conform to the curvature of walls 126, 128 and are retained between the distal edge of walls 126, 128 and proximate wall 130. It is preferred that the profile of each magnet be a mirror image of the other, each having a relatively thin first end with the outer exposed surface 131 of each magnet tapering outwardly away from wall 126, 128, until a predetermined thickness is reached and a plateau 133 is defined. That is to say that the profile of each magnet from one end to the other is generally a wedge-shape prism. As in the previous embodiments, air gap 138 is defined between the magnets which varies in width or thickness as a function of the converging or diverging tapered surfaces of the magnets 134, 136. At its narrowest point between the plateaus 133 of the magnets, the magnetic field produced is greatest. The magnetic field is weakest at the widest portion of the air gap at the opposite end of the magnets.

Figure 15:
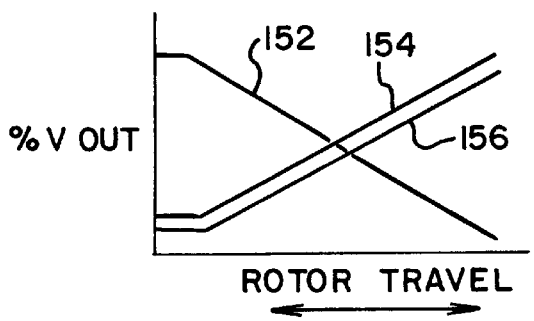

Adapted and configured to be disposed in air gap 138 in a plane substantially midway between walls 126, 128 and between the exposed surfaces of magnets 134, 136 are a plurality of detectors 140, 142, and 144. Each of the detectors 140, 142, 144 are preferably linear output detectors operably coupled by conductors 146 to a circuit 148 which, in turn, is operably coupled by conductors 150 to a signal processing device, display, or combination thereof. In the embodiment shown in FIG. 13, one detector, such as 140, may be configured to produce an output opposite from that produced by the other detectors, such as 142, 144, as they detect the changes in magnetic field caused by the rotation of magnets 134, 136. FIG. 15 graphically illustrates the voltage output from such a configuration as a function of the rotation angle. For example, curve 152 produces a linearly decreasing signal, while curves 154, 156 produce a linearly increasing signal when rotor 124 rotates in a counterclockwise direction as viewed from above. These three outputs may be processed by circuit 148 and sent out over conductors 150 for further manipulation or display. Of course, it is understood that the output produced by detectors 140, 142, and 144 would be reversed from that shown in FIG. 15 if rotor 124, given its present configuration, were to rotate in a clockwise direction.

Figure 14:
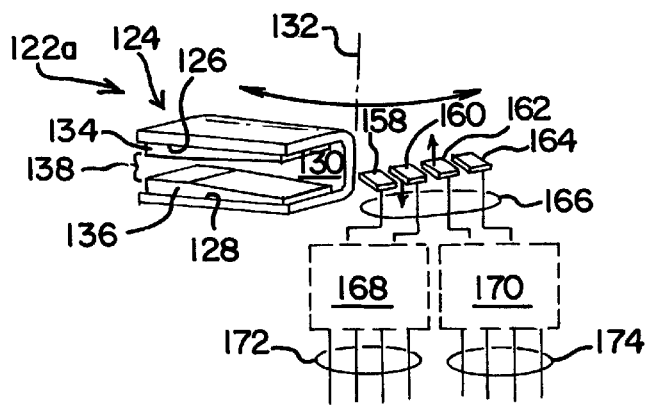
Figure 16:
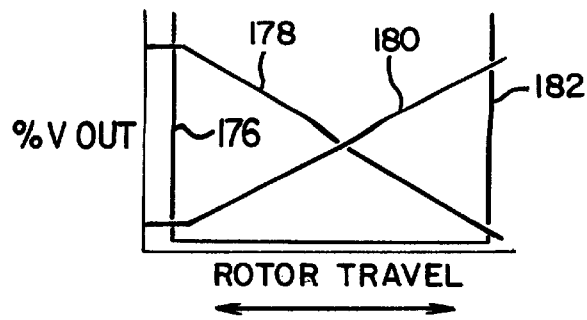

FIGS. 14 and 16 illustrate an alternate embodiment of position sensor 122a which produces a combination of digital and analog outputs in response to the relative position of a linkage such as rotor 124. In this particular embodiment, magnets 134, 136 are disposed in rotor 124 in substantially the same configuration as described above with respect to FIG. 13. Disposed in air gap 138 and spaced laterally from each other by a predetermined distance are a plurality of detectors 158, 160, 162, and 164 operably coupled by conductors 166 to circuits 168, 170, which, in turn, are respectively coupled by conductors 172, 174 to other circuits of the system. Detectors 158 and 164 may be digital detectors which produce a "on/off" output in response to a particular magnetic field strength, while detectors 160, 162 may produce an analog output. In the embodiment shown in FIG. 14, detector 158 produces an "off" response, while detector 164 produces an "on" response when passed through an increasing magnetic field. Detector 160 produces a linearly decreasing output, while detector 162 produces a linearly increasing output (when exposed to an increasing magnetic field). Refer to FIG. 16 for a graphical representation of the outputs as a function of a counterclockwise rotation of rotor 124. In that figure, detector 158 produces a signal 176 which goes from a "high" to a "low" position, while detector 164 produces an output 182 which goes from a "low" to a "high" position as it passes through the increasing magnetic field. Detector 160 produces a linearly decreasing output 178, while detector 162 produces a linearly increasing output 180 under the same increasing magnetic field. If the direction of rotor 124 is reversed to rotate in a clockwise direction, the output shown in FIG. 16 would be reversed. The combination of digital sensors with analog sensors may be, for exemplary purposes, used as a way of monitoring particular extremes of range such as idle and WOT (Wide Open Throttle) in the case of throttle position sensors.

Figure 17:
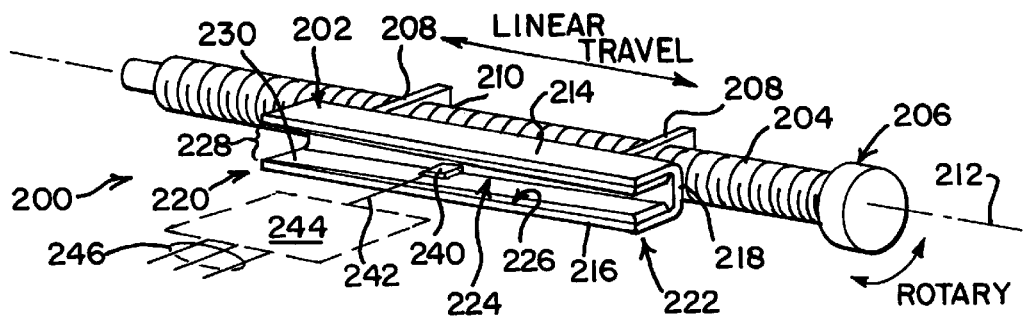

FIGS. 17–20 illustrate alternate embodiments of rotary driven linear actuators including a position sensor in accordance with this invention. In FIG. 17, position sensor 200 includes a bracket 202 mounted to the threaded shaft 204 of a rotary driven spindle or worm 206 by flanges 208. Each flange 208 has a threaded opening 210 which receives threaded shaft 204 and moves bracket 202 linearly along axis 212 when spindle 206 is rotated about axis 212. Bracket 202 may be placed in a suitable chase or track or retained by some other device to prevent rotation of the bracket about axis 212 when spindle 206 is similarly rotated.

Bracket 202 has a longitudinal axis paralleling axis 212 and has a generally C-shaped transverse profile defined by an upper flange 214 interconnected to a lower flange 216 by a central flange 218. In one embodiment, flanges 214 and 216 are bent with respect to flange 218 such that flange 216 is generally parallel to flange 214 in the transverse axis but is inclined with respect to flange 214 along the longitudinal axis of the bracket. In this configuration, the distance between flanges 214, 216 at a first end 220 is greater than the distance between the two flanges at end 222.

Attached to the interior wall of each flange 214, 216 are magnets 224, 226, such as the molded, bonded-ferrite magnets described above. The dimension of each magnet 224, 226 has a length and width coextensive with the length and width of the interior wall of each flange 214, 216. In one configuration, the thickness of each magnet is substantially the same and constant along its length and width, thus the air gap between the opposing inner surfaces of the magnets 224, 226 closely parallels the angle of inclination between flanges 216, 214 moving along the longitudinal axis of the bracket 202. Moreover, the change in the magnetic field thus is weaker at end 220 than at end 222 where the inner surfaces of the magnets 224, 226 are at their closest proximity to each other.

Figure 18:
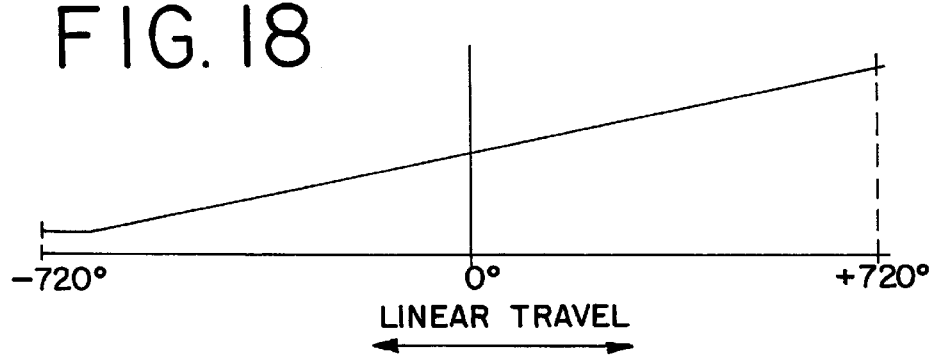

Disposed within the air gap 228 between the inner surfaces of magnets 224, 226 is at least one Hall effect or magnetoresistor detector 240 located so as to maintain a position substantially between the inner surfaces of magnets 224, 226 and on the longitudinal axis of bracket 202 and magnets 224, 226. Detector 240 is operably coupled by conductor 242 to circuit 244 which, in turn, is operably coupled by conductors 246 to one or more circuits, which either process or display the output from detector 240. Although it is preferred that an analog Hall effect detector 240 be used in the particular application, a digital device may also be used which may turn "on/off" upon detecting a particular magnetic field strength. FIG. 18 graphically illustrates the output produced by an analog detector as a function of the angular rotation of spindle 206 which controls the linear movement of bracket 202. These relationships can be determined with a fairly high degree of specificity for a given thread pitch along the shaft 204 of the spindle 206. For example, in FIG. 18 the output is shown between a −720° and a +720° of revolution spindle 206.

Figure 19:
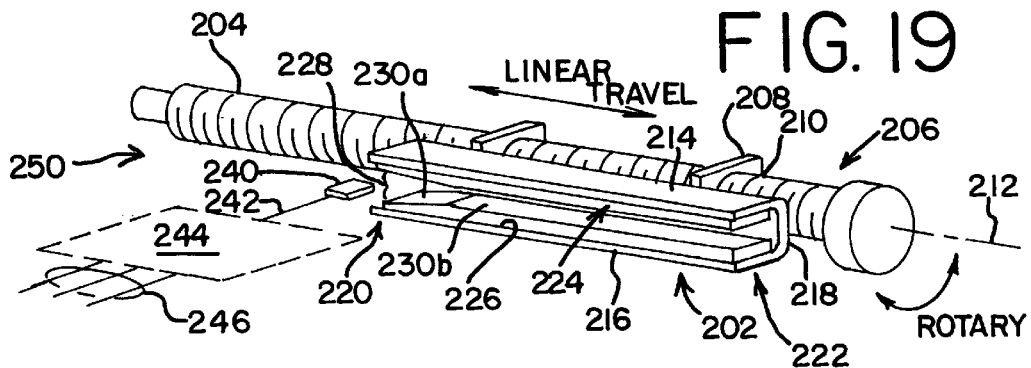

To change the rate of change of the magnetic field produced by magnets 224 and 226 in the embodiment 200 shown in FIG. 17, the substantially solid rectangular magnet geometry may be substituted by a prism or wedge-shaped geometry wherein the taper or wedge shape increases from end 220 toward end 222. Using this type of configuration, the rate of change in the strength of the magnetic field will be substantially greater than that produced by magnets of generally uniform thickness. In this latter configuration, a higher voltage output can be produced for a given linear movement of bracket 202, such as shown in FIG. 19. Position sensor 250 includes bracket 202 mounted onto shaft 204 of spindle 206 by threaded nuts 208 passing through threaded opening 210. Spindle 206 is adapted to be rotated about axis 212. Bracket 202 includes upper flange 214 interconnected to lower flange 216 by wall 218. Bracket 202 substantially parallels axis 212 having first end 220 and a second, opposite end 222. As seen from either end 220, 222, bracket 202 has a substantially C-shaped cross-sectional profile which defines a channel open in a direction away from spindle 206. Attached to interior walls of flange 214, 216 are bonded-ferrite magnets 224, 226, such as described earlier. Air gap 228 is defined by the interior surfaces 230a, 230b of each magnet to receive detector 240 substantially midway between magnets 224, 226. Detector 240 may be supported within the air gap 228 by a non-conductive material such as a polymeric circuit board (not shown). Detector 240 may also be operably coupled to a circuit 244 by one or more conductors 242. In turn, circuit 244 may be operably coupled by conductor bundle 246 to one or more processes and/or displays not shown.

In the embodiment shown, each magnet 224, 226 may have a generally prismatic geometric configuration having a first surface bonded to the inner wall of each flange 214, 216, and a second opposite surface defined by a tapered portion 230a and a plateau portion 230b generally paralleling the opposite surface of the magnet adhered to flange 214 or 216. Tapered surface 230a may be defined proximate end 220 or, alternatively, anywhere along the length of each magnet to suit the particular configuration. As was discussed above, as the air gap between the surface of the magnets decreases, the magnetic field defined within the air gap increases. The magnetic fields may be constant by making the air gap constant over a predetermined length of the bracket, or the rate may be changed by changing the slope of each magnet so that the air gap either converges or diverges.

Figure 20:
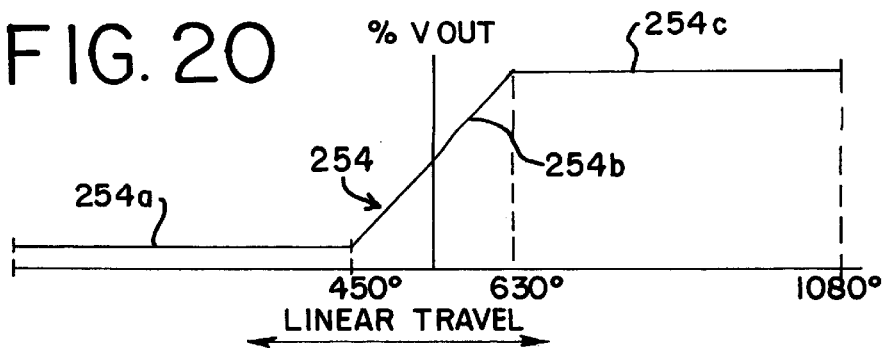

For the embodiment shown in FIG. 19, FIG. 20 graphically represents the output produced by such a configuration. Curve 254 includes portion 254a which represents the output of detector 240 prior to passing through air gap 228 between magnets 224, 226. Curve 254b represents the voltage output produced by detector 240 as bracket 202 moves magnets 224, 226 along detector 240 such that detector 240 senses the change in magnetic field produced by surfaces 230a of each magnet. Curve 254c represents the constant magnetic field produced by each magnet surface 230b.

In each of the embodiments shown in FIGS. 17 and 19, it is contemplated that multiple Hall effect or magnetoresistor detectors, analog or digital, may be used to produce a desired output. Depending upon the desired dimensions, multiple detectors may be stacked on top of each other as opposed to being spaced laterally along the axis of movement to avoid any signal offset or delay produced by the lateral offset. However, to produce a stacked configuration, magnet thickness will need to be increased as well as the air gap between the opposing magnets.

For each of the embodiments presented above, the detector receives a bias through the respective conductor coupling the detector to the circuit. In response to this bias, the detector produces an output indicative of the strength of the magnetic field immediately surrounding the detector. Mechanical movement of the linkage (rotation of the rotor as shown in FIGS. 1–3, 13, and 14; or linear actuation as shown in FIGS. 7–9, 17, and 19) cause the magnets to move with respect to the sensing detector. If the particular configuration of the magnets results in a constriction or expansion of the air gap between the magnets or an increase or decrease in the thickness of the magnet, the strength of the magnetic field will also vary which is then detected by the detector and a corresponding output is then produced by the detector. The corresponding output may be analog, digital, or any combination of each which may be used by one or more processors or displays to indicate the relative position of the linkage. The detectors may be discrete devices, and where multiples are used in one sensor, arranged for a maximum redundancy or may be multiple detectors formed upon a single common substrate.

The use of two magnets opposite each other substantially reduces the loss through the air gap which otherwise occurs with only a single magnet. The closed magnetic circuit which is formed by the rotor, such as 24 shown in FIGS. 1–3 or the bracket shown in FIGS. 7–9, 17, or 19, improves performance by being less sensitive to bearing play and less sensitive to external, ferromagnetic objects. A closed magnetic circuit exists, for the purposes of this disclosure, when the external flux path of a permanent magnet is confined with high permeability material. Air is understood to be low permeability material. The rotor, or brackets, further reduces the size of the magnets required and may be manufactured from molded or sintered materials. More preferably, the rotor and brackets are formed from sheet steels such as ANSI 430 Stainless Steel.

The magnets used to produce the magnetic fields are preferably formed by molding magnetic materials such as bonded-ferrite. Bonded-ferrite offers both a substantial cost advantage as well as a significant advantage over the other similar magnetic materials in resistance to structural loss due to corrosion and other environmental degradation. Other magnetic materials may be suitable, as will be determined by one skilled in the art. It is further preferred that each of the magnets have a substantially larger area than that of the sensing detector. This greatly reduces the effects of movement in a plane containing the air gap but relatively perpendicular to the direction of sensing translation. By maintaining the sensing detector well within the boundaries of the magnets, non-linearities caused by the bulging effect of the magnetic field may be avoided.

In order to stabilize the bonded-ferrite magnets against irreversible loss, it is preferred to first saturate the magnets and then to demagnetize the magnets by a small amount. It has been found that this reduces loss of precision as a result of temperature excursions and the loss of signal linearity.

The position sensor described herein has several advantages, including low cost (due to the minimal weight and reduced demands on magnetic components) and many performance advantages. These performance advantages include reduced sensitivity to bearing play; resistance to contamination from the environment; reduced sensitivity to externally located fields, energies, and objects; precision linearity and output signal; and durability for both full stroke motions and dithers.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is defined by the following claims.

The embodiments of the invention in which an exclusive property or privilege is claimed are defined as follows:

1. A sensor for detecting the position of a mechanical linkage relative to a reference point, comprising:

a pair of magnets, each magnet having a surface including at least a first and a second ramp section;

a magnetically permeable bracket interconnecting said pair of magnets in spaced-apart relationship and opposite each other to define a longitudinally extending air gap therebetween with said magnets facing each other across said air gap and with said magnets aligned in a manner such that the surface including the first and second ramp sections of one of the magnets faces the surface including the first and second ramp sections of the other of the magnets so that the first ends of said magnets are positioned opposite each other and the second ends of said magnets are positioned opposite each other and so that said air gap between said magnets varies in dimension longitudinally over a distance corresponding to at least a portion of the surface of the first and second ramp sections of the magnets;

said pair of magnets and said magnetically permeable bracket being mounted relative to a mechanical linkage in a manner such that movement of said mechanical linkage causes movement of said magnets and said bracket;

said pair of magnets and said magnetically permeable bracket forming a continuous magnetic circuit and producing a magnetic field coupled between said pair of magnets, said magnetic field having linearly varying strength lengthwise of said longitudinally extending air gap over the distance corresponding to at least a portion of the surface of the first and second ramp sections of the magnets; and at least one detector fixedly mounted within said air gap intermediate said pair of magnets and positioned to detect said strength of said magnetic field between said magnets and to generate an output representative of the strength of said magnetic field.

2. The sensor as defined in claim 1, wherein said at least one detector includes at least one of an analog output circuit and a digital output circuit.

3. The sensor as defined in claim 1, wherein said magnets move linearly with respect to said at least one detector.

4. The sensor as defined in claim 1, wherein each magnet includes a prism-shaped longitudinal profile.

5. The sensor as defined in claim 1, wherein said air gap converges from one end of said magnets toward an opposite end of said magnets.

6. The sensor as defined in claim 1, wherein the bracket is attached to the mechanical linkage, said bracket having a pair of opposite sidewalls interconnected by a bottom wall, and each magnet is attached to and covers an interior surface of each sidewall.

7. The sensor as defined in claim 6, wherein said bracket is disposed at one end of a linkage rod and said bracket is movable between first and second positions by movement of the linkage.

8. The sensor as defined in claim 6, wherein said bracket is attached to at least one of a screw drive and a worm.

9. The sensor as defined in claim 6, wherein at least one of said opposite sidewalls is disposed at an angle with respect to a translational axis of said linkage.

10. The sensor as defined in claim 1, wherein said bracket has a C-shaped cross-sectional profile defining parallel first and second outwardly extending walls interconnected to each other at one end by a magnetically permeable pole piece with one of said pair of magnets being attached to said first outwardly extending wall and a second of said pair of magnets being attached to said second outwardly extending wall.

11. The sensor as defined in claim 10, wherein said bracket moves in an arc with respect to said at least one detector.

12. The sensor as defined in claim 11, wherein said bracket is caused to move by a rotor interconnected therewith.

13. The sensor of claim 10, wherein each magnet has a flat surface bonded to said bracket.

14. The sensor as defined in claim 13, wherein each magnet has a length and a width substantially greater than a length and a width of said at least one detector.

15. The sensor of claim 1 wherein the first ramp sections on the magnets have corresponding slopes structured to provide a varying air gap dimension between the first ramp sections.

16. The sensor of claim 15 wherein the second ramp sections on the magnets have corresponding second slopes different from the first slopes.

17. The sensor of claim 16 wherein the second ramp sections on the magnets are structured to provide a constant air gap dimension between the second ramp sections.

18. An automotive linkage position sensor, comprising in combination:
   a mechanically actuated linkage member movable between first and second positions;
   first and second magnets each having a surface including at least a first and a second ramp section, said first and second magnets being interconnected by a magnetically permeable bracket and being positioned opposite each other to define an air gap therebetween with said magnets facing each other across said air gap and with the surface including the first and second ramp sections of the first magnet being aligned to face the surface including the first and second ramp sections of the second magnet, said interconnected first and second magnets and said magnetically permeable bracket forming a continuous magnetic circuit and producing a magnetic field having linearly varying strength over a distance corresponding to at least a portion of the surface of the first and second ramp sections of the magnets;
   said interconnected magnets being mounted relative to said mechanically actuated linkage member in a manner such that movement of said mechanical linkage member causes movement of said magnets; and
   at least one detector received within said air gap substantially midway between said first and second magnets to detect said magnetic field, said at least one detector fixed with respect to said movable mechanically actuated linkage member.

19. The position sensor as defined in claim 18, wherein said linkage member moves in an arc with respect to said at least one detector.

20. The position sensor as defined in claim 18, wherein said linkage member moves linearly along an axis with respect to said at least one detector.

21. The position sensor as defined in claim 18, wherein at least a portion of each of said first and second magnets has a wedge-shaped longitudinal profile.

22. The position sensor as defined in claim 18, wherein at least one of the ramp sections of each magnet is inclined with respect to an axis of movement of said linkage member.

23. The position sensor as defined in claim 18, wherein the surface of each of said first and second magnets has a length and a width substantially greater than said at least one detector such that said detector is not exposed to any bulging magnetic fields produced at a periphery of said first and second magnets.

24. The sensor of claim 18 wherein the first ramp sections on the first and second magnets have corresponding slopes structured to provide a varying air gap dimension between the first ramp sections.

25. The sensor of claim 24 wherein the second ramp sections on the first and second magnets have corresponding second slopes different from the first slopes.

26. The sensor of claim 15 wherein the second ramp sections on the first and second magnets are structured to provide a constant air gap dimension between the second ramp sections.

27. A sensor for detecting a position of a movable piece, comprising:
   a) a bracket, coupled to the movable piece and being magnetically permeable, having a first and second parallel flange;
   b) a first and second magnet coupled to the first and second flange respectively, the first and second magnets having:
      1) opposing first ramp sections and opposing second ramp section;
      2) the first ramp section of each magnet having a first slope that is relative to the first flange; and
      3) the second ramp section of each magnet having a second slope that is relative to the first flange, wherein the second slope is different from the first slope;
   c) a magnetic field coupled between the first and second magnets, having a linearly varying flux strength determined by varying distances between the opposing first and second magnets;
   d) a continuous magnetic circuit formed from the bracket, the first and second magnets and the magnetic field; and
   e) a detector positioned between the first and second magnets for determining the position of the moveable piece.

28. The sensor of claim 27 including a third flange for connecting the first and second flange.

29. The sensor of claim 27 wherein the second slope is parallel to the first flange.

30. The sensor of claim 27 wherein the second slope is positive.

31. The sensor of claim 27 wherein the detector is a Hall effect device.

32. The sensor of claim 27 wherein the first and second magnets move in an arcuate oath relative to the detector.

33. The sensor of claim 27 wherein the first and second magnets move linearly with respect to the detector.

* * * * *